United States Patent
Rossé

Patent Number: 5,149,258
Date of Patent: Sep. 22, 1992

[54] EXTRUSION NOZZLE

[75] Inventor: Meinrad Rossé, La Tour-de-Peilz, Switzerland

[73] Assignee: Nestec S.A., Vevey, Switzerland

[21] Appl. No.: 473,219

[22] Filed: Jan. 31, 1990

[30] Foreign Application Priority Data

Feb. 21, 1989 [CH] Switzerland .................... 603/89

[51] Int. Cl.⁵ .............................................. B29C 47/16
[52] U.S. Cl. ................................. 425/190; 99/483; 425/380; 425/461
[58] Field of Search ........... 425/461, 188, 380, 190, 425/406; 264/108; 99/348, 353, 483

[56] References Cited

U.S. PATENT DOCUMENTS

| Re. 30,221 | 2/1980 | Moreno | 425/466 |
| 2,168,288 | 8/1939 | Fischer | 264/108 |
| 2,730,760 | 1/1956 | Bibby | 425/188 |
| 2,774,106 | 12/1956 | Bethe | 425/461 |
| 3,225,715 | 12/1965 | Page | 425/203 |
| 3,296,346 | 1/1967 | Shannon | 264/108 |
| 3,833,704 | 9/1974 | Nissel | 264/177.1 |
| 3,880,069 | 4/1975 | Moline | 425/296 |
| 4,322,202 | 3/1982 | Martinez | 425/461 |
| 4,364,722 | 12/1982 | Phipps | 425/817 C |
| 4,536,357 | 8/1985 | Hayashi et al. | 425/461 |

Primary Examiner—Jay H. Woo
Assistant Examiner—W. J. Matney, Jr.
Attorney, Agent, or Firm—Vogt & O'Donnell

[57] ABSTRACT

A nozzle for depositing a layer of fluid mass has a coupling defining a nozzle entry passage, a body integral with the coupling which extends linearly from the coupling to a curved body portion which extends to a nozzle end which defines an exit slot. The body has a parallelepipedic cross-section shape wherein two opposing sides thereof widen and two opposing sides thereof narrow as the body extends away from the coupling at the apex of the body at the coupling to the nozzle end. The sides of the body which widen define, together with the sides that narrow, the exit slot and terminate tangentially to the horizontally plane in a form of an arc of a circle which has a center at an apex of the body.

10 Claims, 7 Drawing Sheets

EXTRUSION NOZZLE

BACKGROUND OF THE INVENTION

This invention relates to a nozzle for depositing a layer of fluid mass, more particularly foamed dough.

There are various types of extrusion nozzles comprising one or more extrusion slots for forming one or more strips of dough intended, in particular, for the production of flat loaves or pizza bases, for example.

The problems involved in the design of these known nozzles concern the need to obtain strips having a uniform thickness or smooth surface which can be cut into articles of regular shape. These problems have been solved in particular as a function of the fact that the dough to be extruded to make flat loaves or pizza bases has a relatively firm plastic consistency and that fairly considerable pressure has to be applied to the dough to force it through the slots.

Thus, in one known nozzle, a grid or diffusion passages opening into a pressure equalizing chamber are provided between the head of the screws of an extruder and the extrusion slots.

Similarly, in another known nozzle, the extrusion slot is preceded by a diaphragm itself comprising a slot which is narrower at the center than at the sides, for example, so as to establish a certain uniformity of the stream of dough which moved at a higher speed at its center than at its sides.

However, these known solutions are hardly applicable to the deposition of a layer of fluid mass, particularly expanded dough, for example "Genoese" dough.

The deposition of a layer of fluid mass onto a conveyor belt intended, for example, to transport the mass through a treatment installation, such as an oven or cooking tunnel for example, can involve difficulties similar to those mentioned above. This is because it may be necessary to obtain a layer having a uniform thickness and texture and a regular surface over its entire width. However, this is more difficult, the wider the layer. Now, in continuous industrial production, for example, it is essential to be able continuously to deposit a layer of fluid mass as wide as possible in order fully to exploit the capacity of a treatment installation of large dimensions.

The problem addressed by the present invention is to provide a nozzle which enables this industrial objective to be optimally achieved.

SUMMARY OF THE INVENTION

The nozzle for depositing a layer fluid mass, particularly expanded dough, according to the invention is characterized in that it comprises a coupling defining an entry passage, an inclined triangular body integral with the coupling and having a parallelepipedic cross-section which widens and slopes downwards in the downstream direction and, in the extension of said body, a curved end terminating tangentially to the horizontal plane and defining an exit slot in the form of an arc of a circle of which the center is at the apex of the body.

It has been found that a nozzle thus designed can be manufactured on a very large scale while, at the same time, effectively providing for the deposition of a layer of fluid mass having a perfectly homogeneous thickness and texture and a perfectly regular surface over its entire width. Thus, it has been possible to construct, for example, a nozzle having an exit slot more than one meter wide which is capable of depositing a layer of expanded dough with not even the least longitudinal groove arising out of local contraction such as could occur in particular at the junction of the two streams issuing from two smaller adjacent nozzles, nor even the least collapsing of its sides.

DETAILED DESCRIPTION OF THE INVENTION

The nozzle according to the invention is part intended for connection to a feed pipe for fluid mass supplied by a pump connected to an installation in which the fluid mass is prepared. As this type of pipe is preferably circular in cross-section, the said coupling may be designed to ensure a regular transition between this circular cross-section and the parallelepipedic, preferably square, cross-section of the apex of the body of the nozzle. Thus, in one preferred embodiment of the nozzle according to the invention, the entry passage has a cross-section of substantially constant surface area which changes from circular to square in shape in the downstream direction.

The success achieved with the nozzle according to the invention in regard to the homogeneity and regularity of the layer of fluid mass which it deposits is probably attributable to the combined effects of two essential factors represented, on the one hand, by its general shape and, on the other hand, by the specific shape of its exit slot.

The general shape is that of an inclined, preferably gently sloping, triangular body which decreases in thickness with increasing width and which terminates tangentially to the horizontal plane under the effect of the curvature of its end.

In the context of the invention, "gently sloping" is understood to mean a plane which forms an angle of approximately 20° to 40° with the horizontal plane. So far as the curvature is concerned, it may be sufficiently pronounced to provide the nozzle with adequate rigidity, but also sufficiently gradual not to affect the stream of mass to be deposited. Thus, the curved end preferably has a concave curvature of which the radius is equal to 0.2 to 1.5 times the width of the exit slot. Similarly, the curved end preferably has a constant concave curvature over its entire width comprised between two parallel lines situated upstream of the exit slot.

On the same lines, the angle at the apex of the triangular body is preferably acute so that the stream of mass to be deposited is able to change smoothly from the cylindrical shape which it may have on entering the nozzle to the flat layer shape which it assumes on leaving the nozzle. Thus, in one preferred embodiment, the nozzle according to the invention has a length-to-width ratio of from 1.5:1 to 2.5:1. In this context, the term "width" of the nozzle is to be understood as its maximum width, in other words as the width of its exit slot.

The specific shape of the exit nozzle is that of an arc of a circle of which the center is at the apex of the triangular body. By virtue of this shape, all the elements of fluid mass which form the stream travel the same distance between entering and leaving the nozzle, and the rate of travel of the stream is highly uniform over the entire width of the exit slot.

The nozzle according to the invention may be made in one piece by welding two triangular sheets, namely an upper sheet and a lower sheet, to two side sheets and fixing this assembly to a suitable coupling. The sheets may be cut, for example, from stainless steel sheet.

More robust forms of the nozzle according to the invention may also be obtained, in particular by providing, for example, radial, longitudinal, transverse or lateral reinforcements or supports.

In one preferred embodiment, the nozzle according to the invention comprises a reinforcing cage comprising two grids formed by transverse and radial spars applied to and beneath the triangular body and connected on either side of the body by cross-members. The cross-members may be removable, pivoted or adjustable in length so that the body of the nozzle can be removed from the cage to be cleaned and then replaced with precision.

The transverse and radial spars of a grid may be formed, for example, by metal tubes of square or rectangular cross-section and may be fixed, for example welded, to one another at all their intersections.

One of the two grids may also be formed by radial framing spars fixed to the ends of its transverse spars, its other radial spars and its transverse spars being connected at all their intersections by means for adjusting the spacing between them.

These means for adjusting the space separating, for example, a transverse spar from a radial spar supported by the triangular body are intended to enable the stream of fluid mass to be finely rectified by adjusting its thickness at various points of the body.

In this preferred embodiment, curved projecting supports fixed to a last lower transverse spar and having a curvature adapted to that of the said curved end may be provided in order further to increase the rigidity of that curved end.

Finally, more versatile embodiments of the nozzle according to the invention are possible, in particular by providing a device for adjusting the height of the exit slot.

Thus, another preferred embodiment is characterized by the provision of lateral reinforcements on the sides of the curved end of the nozzle, means for tightening seals between these lateral reinforcements and the sides of an upper movable lip of the exit slot, a transverse arm fixed to the lateral reinforcements above the movable lip and means for adjusting the distance between the transverse arm and the movable lip.

The nozzle according to the invention is thus intended for the deposition of a layer of fluid mass. One example of a fluid mass which can be deposited by means of the nozzle according to the invention is a foamed dough and, in particular, a "Genoese" dough. Typically composed of eggs, sugar, flour and water, a Genoese dough may be foamed cold, for example in a mixer or beater, and may have a relatively low density of the order of 0.4 to 0.5 g/cm$^3$ and a relatively low viscosity, for example of the order of 60 to 120 Pa.s at 20° C.

Some examples of embodiments of the nozzle according to the invention are described in detail in the following with reference to the accompanying drawings.

DETAILED DESCRIPTION OF THE DRAWINGS

Figure 1:
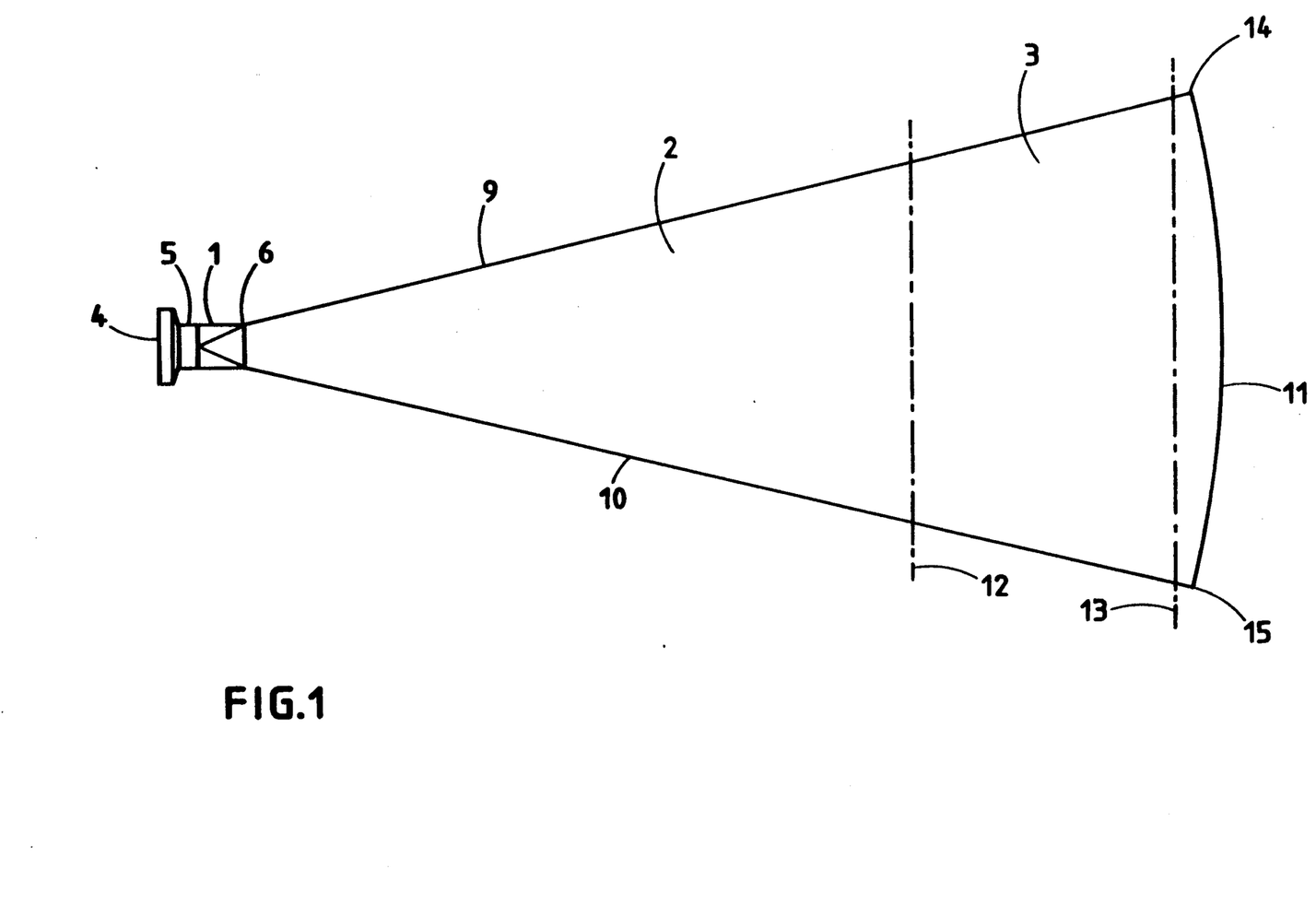
FIG. 1 is a plan view of a first embodiment of the nozzle according to the present invention.
Figure 2:
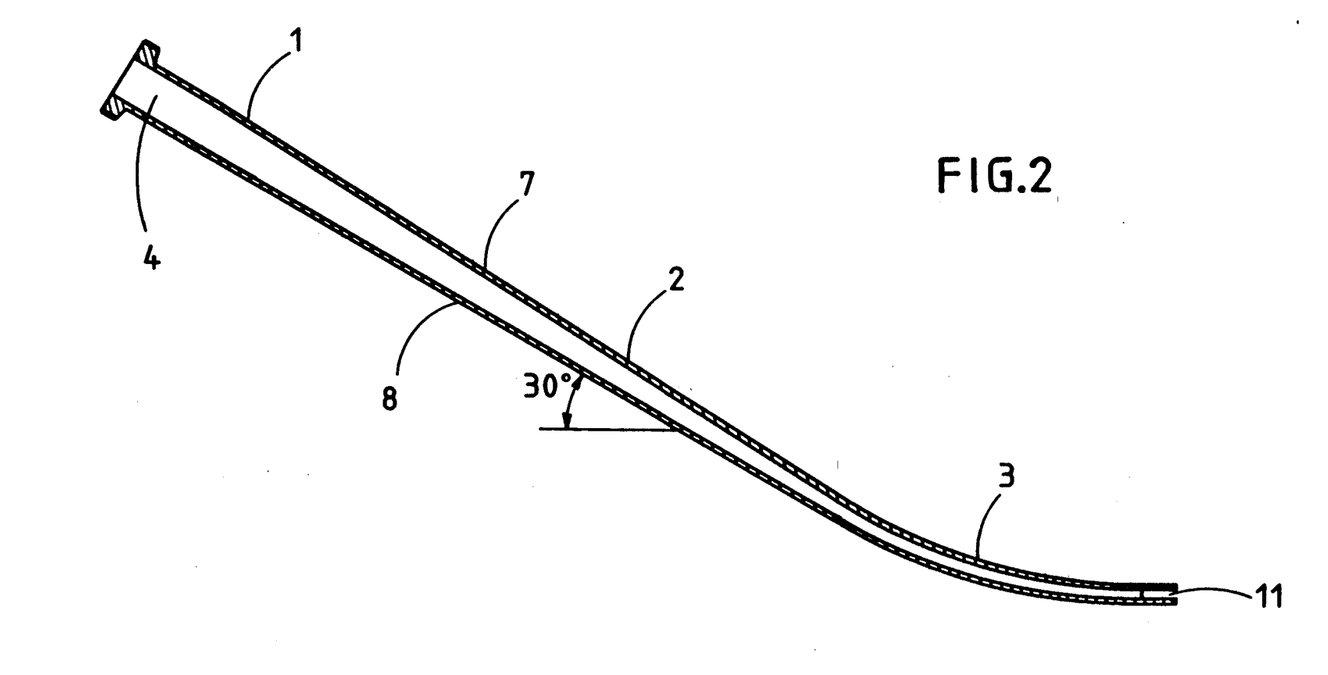
FIG. 2 is a longitudinal section through the first embodiment shown in FIG. 1.

The first embodiment of the nozzle according to the invention shown in FIGS. 1 and 2 comprises a coupling 1, an inclined triangular body 2 integral with the coupling 1 and, in the extension of the body 2, a curved end 3 terminating tangentially to the horizontal plane.

The coupling 1 defines an entry passage 4 of substantially constant cross-sectional area which changes from a circular shape 5 to a square shape 6 in the downstream direction.

The triangular body 2 is disposed in a plane forming an angle of 30°) with the horizontal plane. It is formed by two triangular sheets, namely an upper sheet 7 and a lower sheet 8, cut from a sheet of stainless steel and welded to two lateral sheets 9 and 10 which form four sides of the body 2 so that it has a parallelepipedic cross-section in which two opposing sides 7 and 8 widen and the other two opposing sides 9 and 10 narrow as the body 2 extends linearly away from coupling 1 in the downstream direction. This cross-section thus assumes the shape of a square at the apex of the triangle and then the shape of a rectangle of consistently lesser height and greater width.

The curved end 3 of the nozzle defines an exit slot 11 in the form of an arc of a circle of which the center is at the apex of the body end. The width of the slot 11 is approximately equal to half the length of the nozzle. The curved end 3 has a concave curvature of which the radius is approximately equal to the width of the slot. This concave curve is constant over the entire width of the end, being comprised between two parallel lines 12 and 13 situated upstream of the exit slot. The first (12) of these lines corresponds to the end of the triangular body 2 and to the beginning of the curved end 3. The second (13) of these lines is situated slightly upstream of the ends 14 and 15 of the slot 11 so that the arc described by the slot is situated in a horizontal plane.

Figure 3:
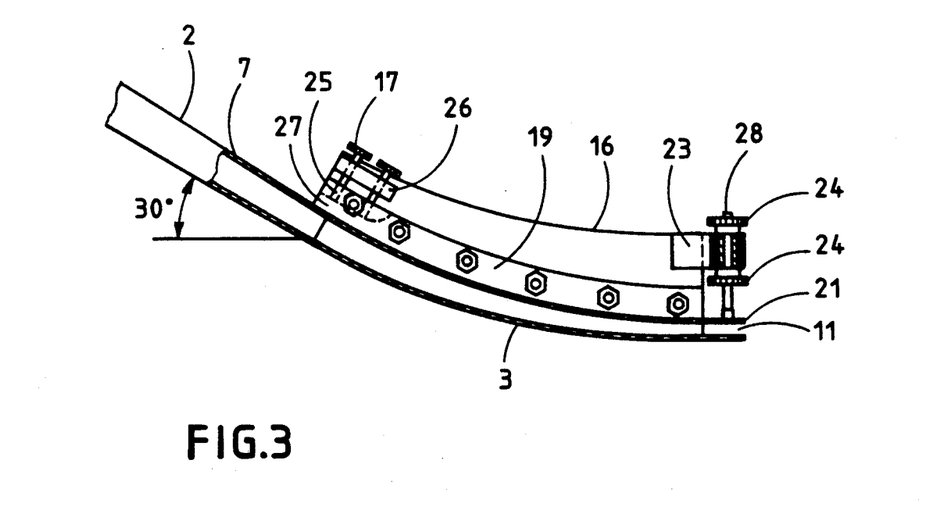
FIG. 3 is a partial longitudinal section through the end of a second embodiment of the nozzle according to the present invention.
Figure 4:
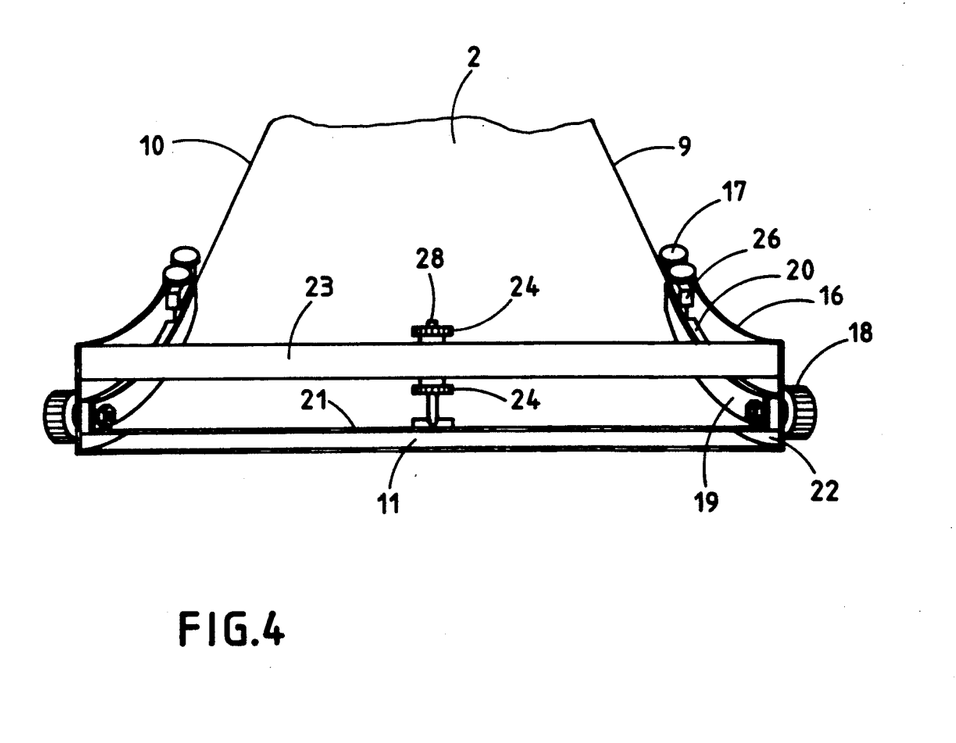
FIG. 4 is a front view of the end of the second embodiment shown in FIG. 3.

The second embodiment of the nozzle according to the invention, which is shown in FIGS. 3 and 4, differs from the first embodiment shown in FIGS. 1 and 2 in the fact that it has an exit slot of adjustable height. The coupling 1 and the triangular body 2 of this second embodiment are identical with those of the first embodiment. However, the curved end 3 shows significant modifications.

Figure 7:
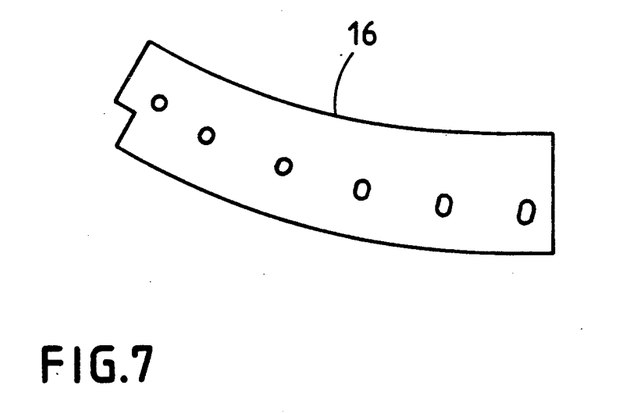

This second embodiment comprises lateral reinforcements 16 (shown separately in FIG. 7) which also form the sides 22 of the curved end of the nozzle in the extension of the sides 9 and 10 of the triangular body 2. It also comprises means 17, 18, 19 for tightening seals 20 arranged between the lateral reinforcements 16 and the sides of an upper movable lip 21 of the exit slot. Finally, it comprises a transverse arm 23 fixed to the lateral reinforcements 16 above the movable lip 21 and means 24 and 28 for adjusting the distance between the transverse arm 23 and the movable lip 21.

The lip 21 is movable by virtue of the fact that the sheet which forms it and which is itself the extension of the upper sheet 7 of the triangular body 2 is not welded to the sides of the curved end, in other words to the lateral reinforcements 16 between which it can be lowered or raised.

Figure 6:
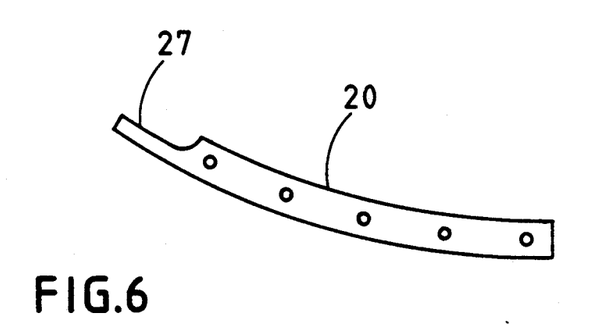

The tightening means mentioned comprise screwthreaded tightening bolts 25 designed to be lowered through their threaded supports 26 by turning their knurled heads 17. The tightening bolts 25 are intended to compress the upstream extensions 27 of reduced thickness of the plastic seals 20 (shown separately in FIG. 6) at the two places where the welds between the upper sheet 7 and the sides of the triangular body 2 finish and where the movable upper lip 21 begins.

Figure 5:
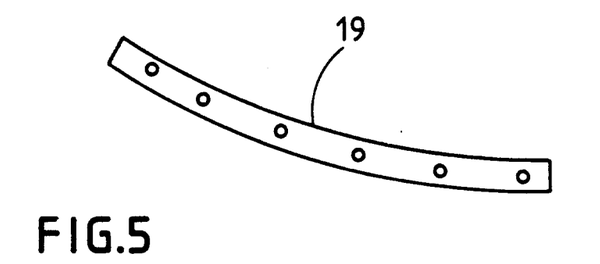
FIGS. 5, 6 and 7 are respectively side elevations of a fixing element of the upper movable lip, a sealing element and a lateral reinforcement of the embodiment shown in FIGS. 3 and 4.

The tightening means further comprise knurled nuts 18 adapted to the screws which pass through fixing elements 19 (shown separately in FIG. 5) which are themselves fixed to the sides of the movable upper lip 21. These nuts 18 are intended to compress the plastic seals 20 between the lateral reinforcements 16 and the fixing elements 19.

The means for adjusting the distance between the transverse arm 23 and the movable lip 21 are intended to adjust the exact height of the exit slot 11 of the nozzle. They comprise a screwthreaded rod 28 adapted to a threaded cylinder with knurled heads 24 serving as a nut. The screwthreaded rod 28 is fixed to the movable lip 21 by an anchoring pin which passes through its lower end. The threaded cylinder is fixed to the transverse arm 23 by two knurled heads 24 which act as a stop on either side of the arm, but allow the cylinder to rotate in a vertical cylindrical passage formed in the arm.

Figure 8:
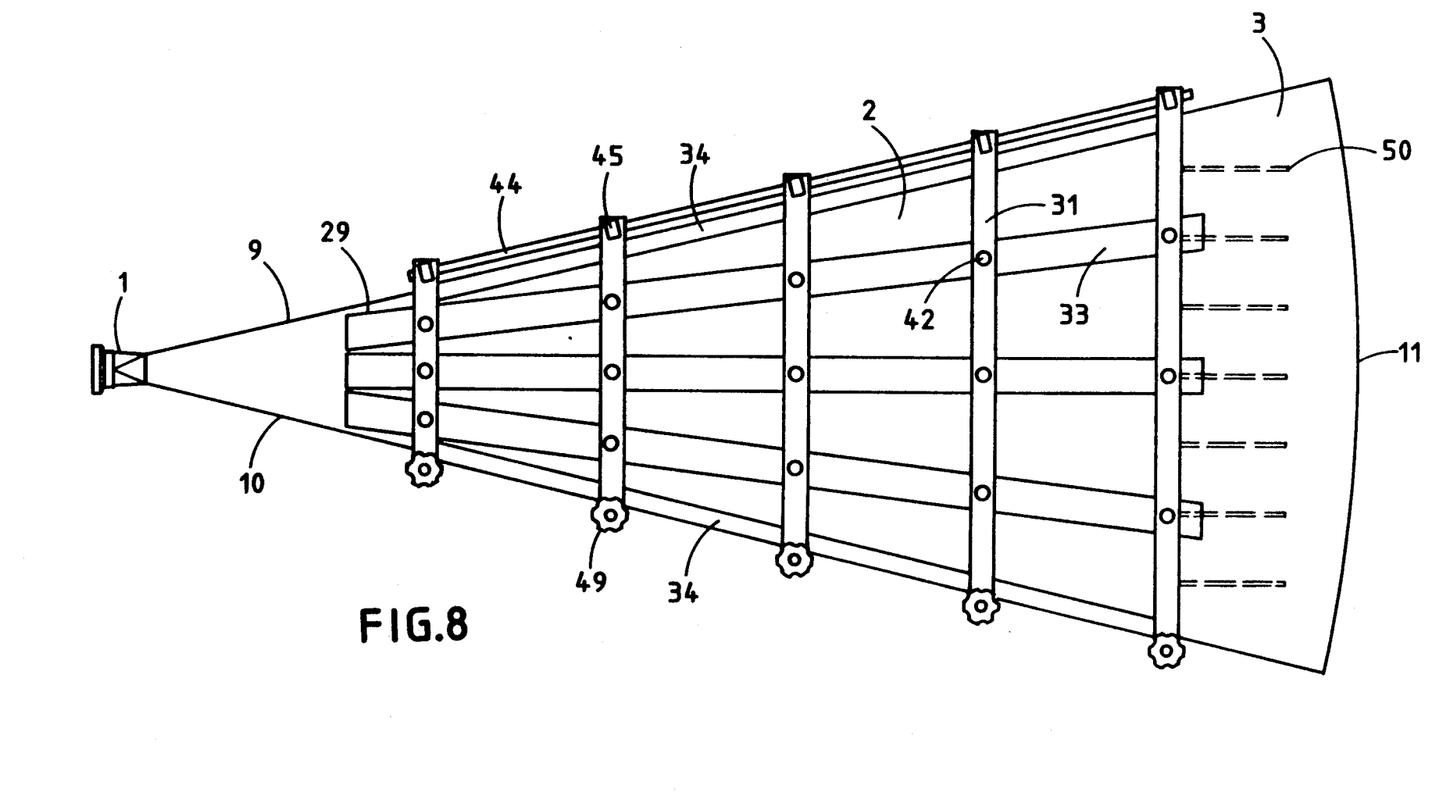
FIG. 8 is a plan view of a third embodiment of the nozzle according to the present invention.
Figure 9:
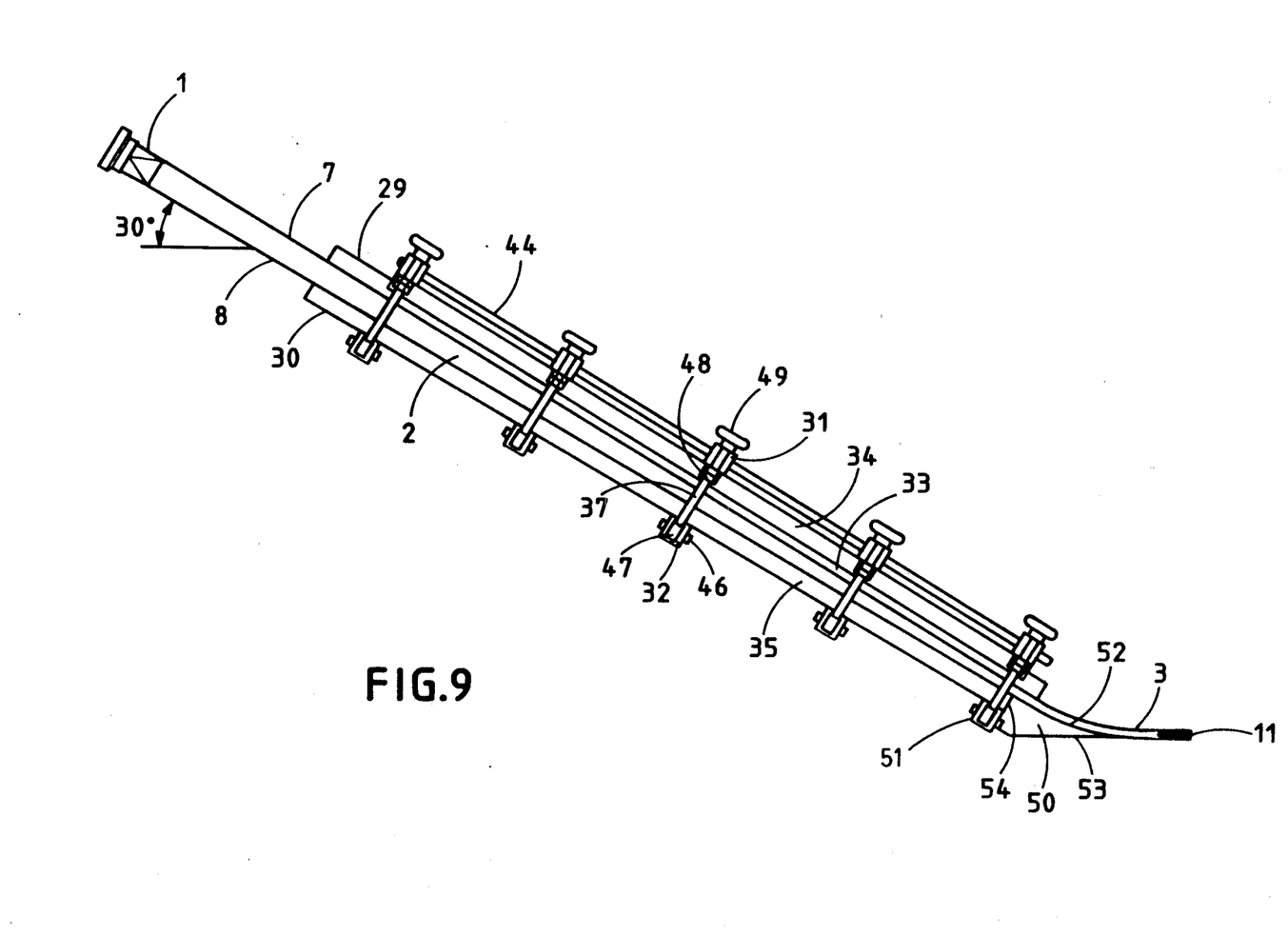
FIG. 9 is a side elevation of the embodiment shown in FIG. 8.
Figure 10:
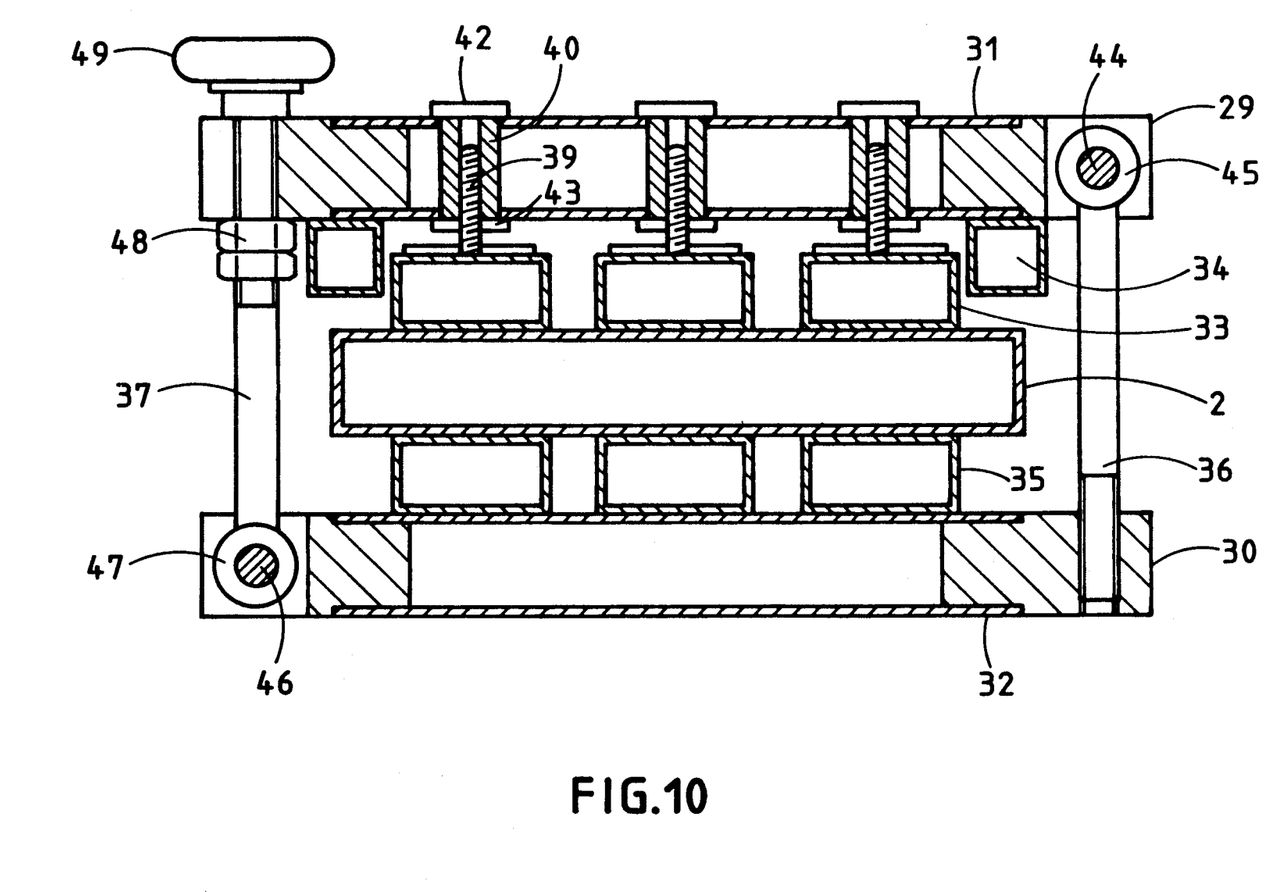
FIG. 10 is a cross-section from downstream of the embodiment shown in FIG. 8.

The third embodiment of the nozzle according to the invention, which is shown in FIGS. 8, 9 and 10, differs from the first embodiment shown in FIGS. 1 and 2 in the fact that it has a smaller length-to-width ratio, namely of the order of 1.8:1, and comprises a reinforcing cage. This embodiment lends itself particularly well to the production of nozzles of large dimensions with a width of one meter or more using upper and lower triangular sheets 7 and 8 and sides 9 and 10 cut from a relatively thin sheet of stainless steel, for example having a thickness of approximately 3 mm.

The reinforcing cage comprises upper and lower grids 29 and 30 formed by transverse spars 31, 32 and radial spars 33, 34, 35 applied on either side of the triangular body 2 and connected on either side of the body by cross-members 36, 37.

The transverse and radial spars 32 and 35 of the lower grid 30 are formed by metal tubes of respectively square and rectangular cross-section and are fixed, i.e., welded, to one another at all their intersections.

The transverse spars 31 and the radial framing spars 34 of the upper grid 29 are formed by metal tubes of square cross-section, the other radial spars 33 of this grid having a rectangular cross-section.

The radial framing spars 34 are fixed to the ends of the transverse spars 31. The other radial spars 33 and the transverse spars 31 are connected at all their intersections by means for adjusting the spacing between them.

These means for adjusting the space separating a transverse spar 31 from a radial spar 33 supported by the triangular body 2 are intended to enable the stream of fluid mass to be finely rectified by adjusting its thickness at various points of the body. These means comprise—at each intersection involved—a screwthreaded rod 39 adapted to a threaded cylinder 40 acting as a nut. The lower end of the screwthreaded rod 39 is fixed to the radial spar 33. The threaded cylinder 40 is fixed to the transverse spar 31 by two discs 42, 43 which act as a stop on either side of the spar, but allow the cylinder to rotate in a vertical cylindrical passage formed in the spar. The stop disc 42 arranged on the spar comprises a three-hole lock adapted to a three-pin key.

The upper and lower grids 29 and 30 are thus interconnected by cross-members 36, 37. The cross-members 36 provided on the left-hand side of the triangular body 2 are each fixed to the left-hand end of a lower transverse spar 32 at their lower ends. However, they are each connected to an upper transverse spar 31 by a cylindrical radial bar 44 which passes both through the left-hand end of the spar and the upper end 45 of the cross-member. The end 45 is itself accommodated in a suitable recess formed vertically in the left-hand end of the spar 31 so that the spar 31 is able to pivot about the bar 44.

The cross-members 37 provided on the right-hand side of the triangular body 2 are each connected to the right-hand end of a lower transverse spar 32 by a bar 46 which passes both through the end of the spar and the lower end 47 of the cross-member. The end 47 is itself accommodated in a suitable recess formed vertically in the end of the spar 32 so that the cross-member is able to pivot about the bar 46.

The upper end of each cross-member 37 is removably accommodated in a vertical recess formed in the right-hand end of each upper transverse spar 31. This upper end is fixed to the spar by a double check nut 48 and a knurled nut 49.

In this embodiment, the body 2 of the nozzle may thus be removed from the reinforcing cage by unscrewing the knurled nuts 49, separating the cross-members 37 from the upper spars 31 and pivoting the upper grid 29 about the bar 44.

This third embodiment also comprises projecting curved supports 50 fixed to the last lower transverse spar 51. These projecting supports 50 each have a concave curvature adapted to the curvature of the curved end 3. They each have the general shape of a triangular spur disposed in a vertical plane of which an upper side 52 has a concave curvature adapted to the curvature of the curved end 3, a lower side 53 is rectilinear and disposed in the same horizontal plane as the exit slot 11 and a small upstream side 54 is rectilinear and fixed to the last lower transverse spar 51.

This embodiment is thus capable of providing a considerable increase in the rigidity of the curved end 3 through the juxtaposition of several of these equidistant supports 50 along the spar 51. At the same time, however, it provides a practical auxiliary means of visually checking the distance between the exit slot 11 and a conveyor belt, for example, onto which the layer of fluid mass is to be deposited.

I claim:

1. A nozzle for depositing a layer of a fluid mass on a surface comprising a coupling defining a nozzle entry passage and a body integral with the coupling having four sides which extend from an apex of the body at the coupling and form a parallelepipedic cross-section shape and wherein two opposing sides thereof widen and two opposing sides narrow as the body extends linearly away from the coupling to a curved body portion which in turn extends to a body end which defines an exit slot wherein the sides that widen each terminate tangentially to a horizontal plane at the body end exit slot in a form of an arc of a circle of which the center is at the apex of the body.

2. A nozzle as claimed in claim 1 wherein the entry passage has a cross-section of constant area which changes from a circular shape to a square shape as it extends to the body.

3. A nozzle as claimed in claim 1 wherein the curved body portion has a curvature such that the linearly extending portion of the body, when disposed in a plane, forms an angle of 20° to 40° with respect to a plane tangential to the body end.

4. A nozzle as claimed in claim 1 wherein the curved body portion has a concave curvature which is constant over its length.

5. A nozzle as claimed in claim 1 wherein the curved body portion has a concave curvature having a radius of from 0.2 times to 1.5 times of a width of the exit slot.

6. A nozzle as claimed in claim 1 wherein the body has a length to width ratio of from 1.5:1 to 2.5:1.

7. A nozzle as claimed in claim 1 further comprising grids which are formed by transverse and radial spars applied upon the sides which widen and further comprising cross-members between the grids about the sides which narrow to connect the grids applied to the sides which wide.

8. A nozzle as claimed in claim 7 wherein two radial framing spars are fixed to the transverse spars at edges of the sides which widen and other radial spars are connected to the transverse spars by means for adjusting the spacing between the spars.

9. A nozzle as claimed in claim 7 further comprising projecting curved supports fixed to a transverse spar nearest the exit slot body end which extend to and are affixed to the body end for increasing the rigidity of the body end.

10. A nozzle as claimed in claim 1 further comprising reinforcements at the exit slot body end on the sides which narrow, a movable lip positioned in the exit slot extending to lip edges encompassed by the reinforcements, seals between the reinforcements and the lip edges, a transverse arm fixed to the reinforcements and the lip, means for tightening the seals between the reinforcements and the lip and means for adjusting the distance between the transverse arm and the lip.

* * * * *

UNITED STATES PATENT AND TRADEMARK OFFICE
CERTIFICATE OF CORRECTION

PATENT NO. : 5,149,258
DATED     : September 22, 1992
INVENTOR(S) : Meinrad ROSSE It is certified that error appears in the above-identified patent and that said Letters Patent is hereby corrected as shown below:

In the ABSTRACT, line 12, "horizontally" should be --horizontal--.

Column 8, line 4 (line 6 of claim 7), "wide" should be --widen--.

Signed and Sealed this

Seventh Day of September, 1993

Attest:

BRUCE LEHMAN

*Attesting Officer*    Commissioner of Patents and Trademarks